July 28, 1925.　　　　　　　　　　　　　　　1,548,007
F. M. JOSLIN
CLUTCH
Filed March 29, 1920　　　2 Sheets-Sheet 1
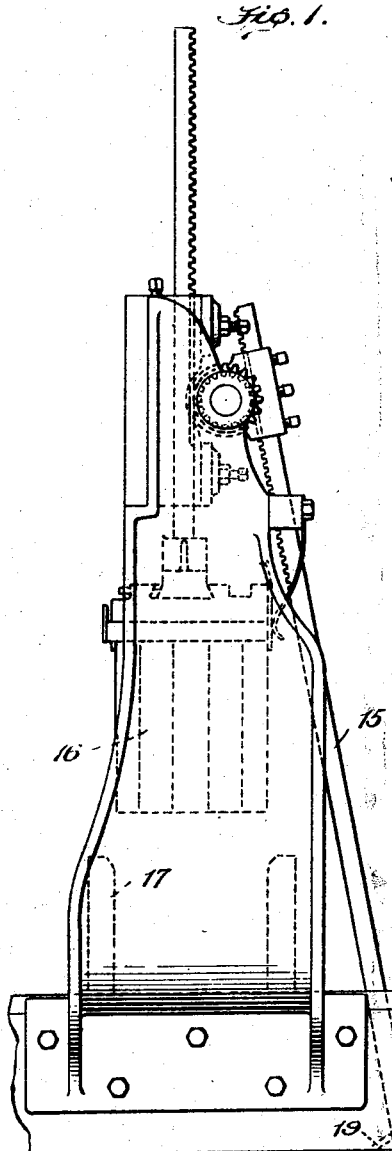
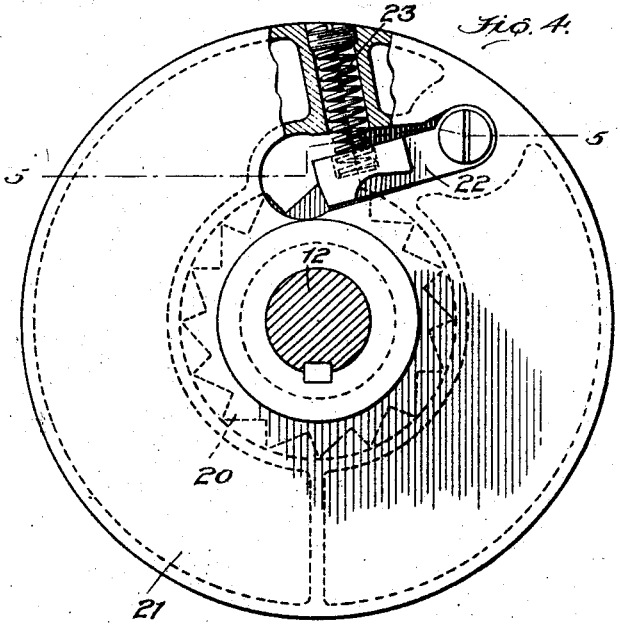
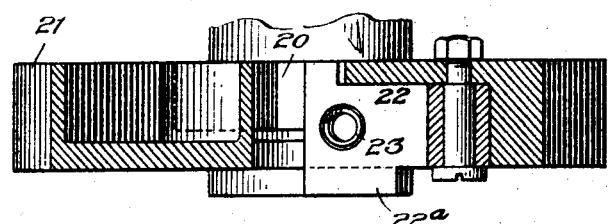
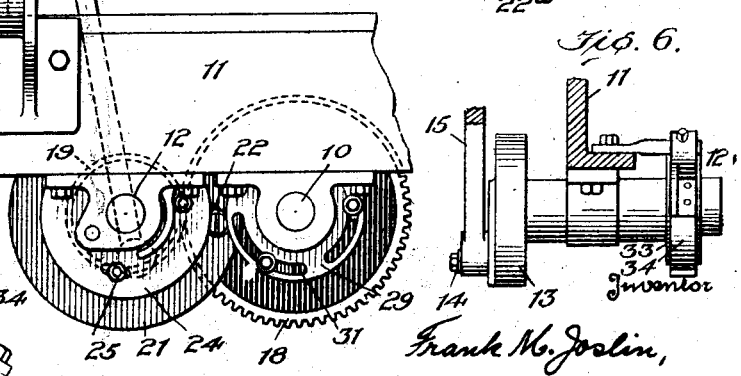
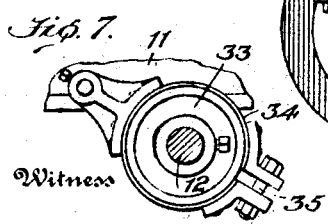

July 28, 1925.

F. M. JOSLIN 1,548,007

CLUTCH

Filed March 29, 1920  2 Sheets-Sheet 2

Witness
Edwin L. Bradford

Inventor
Frank M. Joslin,
By Foster, Freeman, Watson & Coit
Attorneys

Patented July 28, 1925.

1,548,007

UNITED STATES PATENT OFFICE.

FRANK M. JOSLIN, OF AMSTERDAM, NEW YORK, ASSIGNOR TO INMAN MANUFACTURING COMPANY, INC., OF AMSTERDAM, NEW YORK, A CORPORATION OF NEW YORK.

CLUTCH.

Application filed March 29, 1920. Serial No. 369,490.

*To all whom it may concern:*

Be it known that I, FRANK M. JOSLIN, a citizen of the United States, and residing at Amsterdam, Montgomery County, State of New York, have invented certain new and useful Improvements in Clutches, of which the following is a specification.

This invention relates to a clutch mechanism which is primarily intended for use in connection with a machine for making boxes from pasteboard or similar material.

It is the aim of the invention to provide a mechanism of the kind mentioned by which a shaft may be driven so that at predetermined intervals the driving means will be momentarily disconnected from the shaft and to provide means controlled by the driving means for restoring the connection between such parts. The invention further contemplates various improvements in the details of the mechanism by which these results are accomplished. In box making machines, which employ a cooperative plunger and die to form the boxes, it is desirable that the plunger be caused to stop for short intervals at certain points in its travel and the accomplishment of this result is a primary object of the invention. It is to be understood, however, that the invention is not limited to the particular use here mentioned nor to the particular details set forth but that it is capable of employment in various relations and with various modifications as to particular details.

The invention is illustrated in one form in the accompanying drawings in which:

Figure 1 is a side elevation of a part of a box machine with which the invention is particularly intended to be used;

Figure 4 is a view mainly in elevation of one of the parts of the mechanism, certain parts being broken away;

Figure 5 is a sectional view on the broken line 5—5 of Figure 4;

Figure 6 is a side view of certain parts of a friction mechanism employed in connection with the present invention; and Figure 7 is an end view of the mechanism shown in Figure 6.

Figure 2:
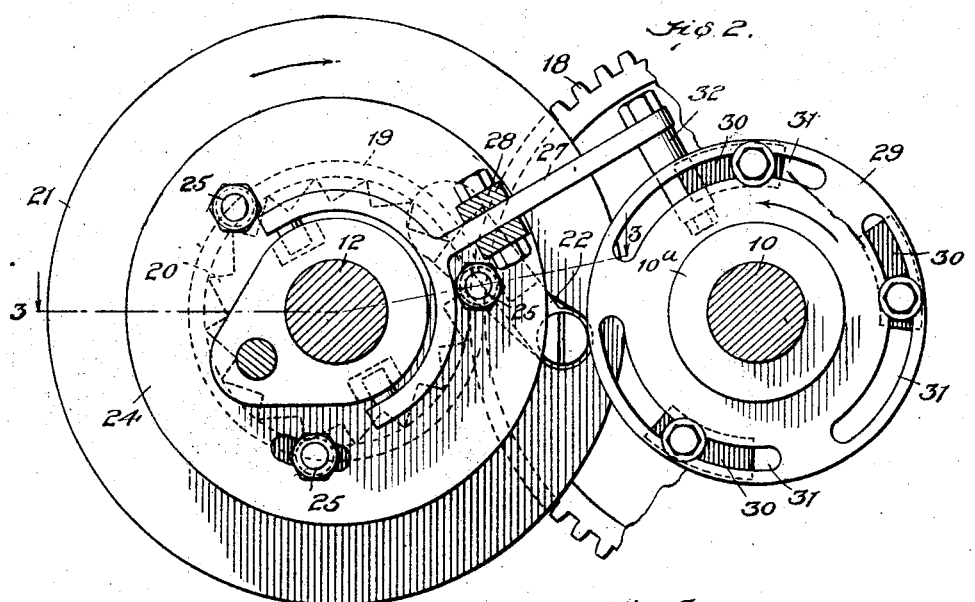
Figure 2 is a transverse sectional view on the broken line 2—2 of Figure 3, showing the mechanism of the present invention in most part in elevation.

Referring to the drawings in detail 10 indicates a shaft which is driven continuously from any suitable source of power, this shaft in the particular mechanism disclosed constituting part of the box making machine. This shaft is suitably journaled on the frame 11 constituting part of the framework of the machine. A second shaft 12, also journaled in the frame 11, is arranged adjacent the shaft 10. A crank disk 13 is secured to the end of the shaft 12 and is provided with a crank pin 14 to which a rack bar 15 is secured, the rotation of said crank disk serving to give a reciprocating motion to said rack bar. By suitable mechanism, the details of which form no part of this invention and which it is unnecessary to describe, the movements of said rack bar cause the plunger 16 of the box machine to enter and recede from the die 17. It is the aim of the present mechanism to cause said plunger to pause at certain points in its travel so as to permit adjustment of the material on which the plunger is operated or permit other operations to be performed.

Figure 3:
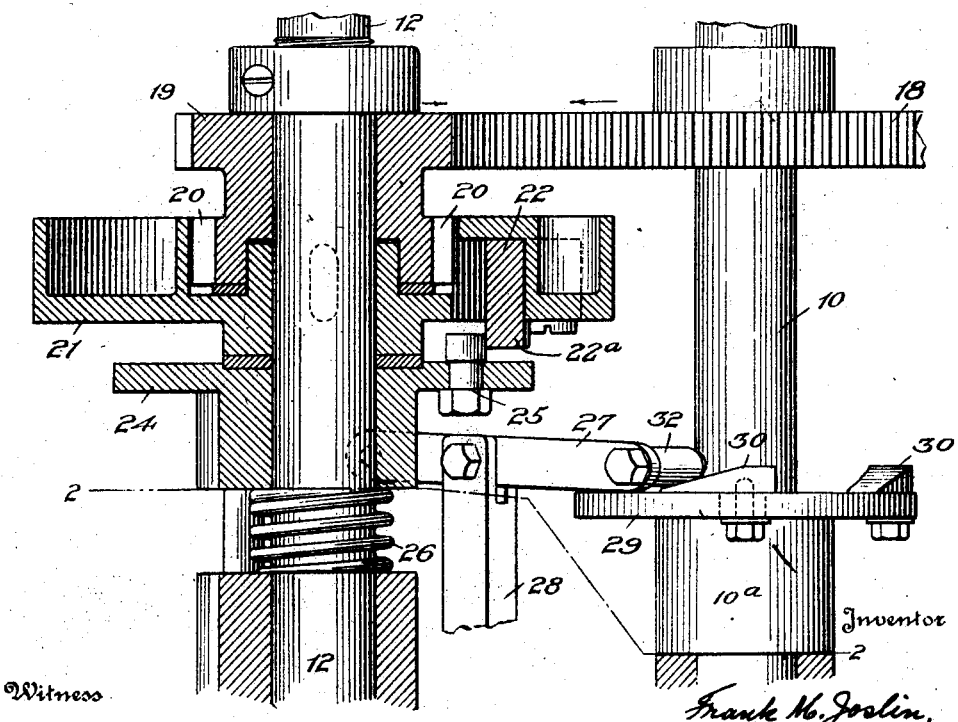
Figure 3 is a longitudinal sectional view on the line 3—3 of Figure 2, parts appearing in elevation.

Referring to the details of the clutch mechanism, and particularly to Figures 2 and 3 of the drawing, it will be noted that the shaft 10 is provided with a gear wheel 18 rigidly secured thereto. A rotary member 19 is loosely mounted on the shaft 12, said rotary member being provided with gear teeth which cooperate with the teeth of the gear wheel 18. The rotary member 19 on its end opposite the gear teeth is provided with a series of projections 20, for a purpose hereinafter pointed out. A disk 21 is keyed to the shaft 12 and said disk carries a dog 22 pivotally connected thereto, said dog being positioned to engage the projections 20 upon the rotary member 19. A coiled spring 23 is arranged to bear on said dog in order to yieldingly hold the same in engagement with said projections. It will be noted that the dog 22 projects a slight distance beyond one side of the disk 21, said projecting portion of the dog indicated at 22ª being provided for a purpose which will presently appear. A sliding member 24 is loosely mounted upon the shaft 12 adjacent the disk 21, which sliding member carries a series of pins or other suitable devices 25, these pins being in such position as to contact with the projecting portion of the dog heretofore referred to with the result that as the disk 21 rotates the dog 22 will contact with said pins 25 and said pins are so positioned that such contact will result in forcing the dog out of engagement with the projections 20 of the rotary member 19. The member 24 is constantly urged toward the disk 21 by means of a coiled spring 26 surrounding the shaft 12.

Means are provided for moving the member 24 along the shaft 12 in order to withdraw the pins 25 from the path of movement of the dog 22, such means comprising a lever 27 pivoted to said member 24 and to a fixed part 28 of the machine. The shaft 10 has secured thereto a sleeve 10$^a$ which carries a cam disk 29 on which a series of cam blocks 30 are mounted, the disk being provided with a series of slots 31 in which said cam blocks may be adjusted. The lever 27 is provided with a roller 32 which is adapted to cooperate with the cam disk 29 and the cam blocks mounted thereon, the result being that as said disk is caused to rotate by the rotation of shaft 10, the lever is caused to move about its pivot on the part 28 which causes movement of said member 24 longitudinally of the shaft 12.

Secured to the shaft 12 is a friction drum 33 which is engaged by a friction band 34, the ends of this band being held together by a bolt 35 by which the amount of friction may be regulated. It is to be understood that this friction mechanism constitutes the means for holding the shaft 12 from rotation during the intervals that it is disconnected from the driving means.

The operation of the device will be clear from the foregoing description and a brief re-statement of the same will suffice. The shaft 10 being constantly driven will cause constant rotation of the rotary member 19 loosely mounted on the shaft 12. The disk 21 being secured to the shaft 12, it follows that said disk and the shaft to which it is secured will be caused to rotate when the dog 22 is in engagement with the projections 20 on said rotary member 19, but that the shaft and disk will cease to rotate when the dog is withdrawn from said projections. The pins 25, mounted on the slidable member 24 cause the dog to be withdrawn from said projections at certain points in the rotation of the shaft 12. Through the operation of the cam disk 29 and the cam blocks mounted thereon the lever 27 is caused to move the slidable member 24 against the action of the spring 26, which movement serves to withdraw the pins 25 from the path of movement of the projecting portion 22$^a$ of the dog 22, thus permitting the dog to engage the projections on the member 19 when rotation of the shaft 12 continues. The length of time during which the pins 25 hold the dog 22 out of engagement with the projections on the rotary member 19 can be regulated by adjusting the cam blocks 30 in the slots 31 provided in the cam disk 29. During the intervals that the shaft 12 is disconnected from the rotary member 19, it is to be understood that the friction mechanism above described prevents rotation of said shaft in either direction, the result being that in the particular mechanism to which the invention is shown as applied the plunger 16 will be caused to remain stationary at certain intervals during its travel toward and from the die.

Having thus described the invention, what is claimed as new and desired to be secured by Letters Patent is:

1. A device of the kind described comprising a shaft, a disk secured thereto, a rotary member mounted in operative relation to said disk and having a series of projections thereon, means for continuously driving said rotary member, a dog pivotally mounted on said disk in position to engage the projections on said rotary member thereby causing rotation of said shaft, means for disengaging said dog from said projections at predetermined points in the rotation of the shaft, said last named means including a cam disk operated by said driving means and having a plurality of cam blocks adjustably mounted thereon.

2. A device of the kind described comprising a shaft, a disk secured thereto, a rotary member mounted in operative relation to said disk and having a series of projections thereon, means for continuously driving said rotary member, a spring pressed dog mounted on said disk in position to engage the projections on said rotary member thereby causing rotation of said shaft, a movable member having pins adapted to contact with said dog during the rotation of said disk and withdraw the same from engagement with said projections, and means operated by said driving means for moving said pins out of contact with said dog thereby permitting the same to re-engage said projections on the rotary member, said last named means including a cam disk having a plurality of cam blocks adjustably mounted thereon.

3. A device of the kind described comprising a driving shaft having a gear wheel thereon, a driven shaft, a disk secured to said driven shaft, a rotary member loosely mounted on said driven shaft and having a series of projections thereon, and also having gear teeth thereon cooperating with the gear wheel of said driving shaft, a spring-pressed dog mounted on said disk in position to engage said projections on the rotary member, a movable member slidably mounted on said driven shaft and having a series of pins arranged to contact with said dog during rotation of said disk to withdraw the same from engagement with said projections, resilient means tending to hold said movable member in position to cause said pins to engage said dog, means for moving said movable member to disengage said pins from said dog, said last named means comprising a cam-disk secured to said driving shaft and having a series of adjustable cams secured thereon, and a lever having one end secured to said movable member and having at the other end a part arranged to engage said cams and friction means for preventing rotation of said shaft when said dog is disconnected from said projections.

4. A device of the kind described comprising a shaft, a disk secured thereto, a rotary member loosely mounted on said shaft in operative relation to said disk, and having a series of projections thereon, means for continuously driving said rotary member, a dog pivotally mounted on said disk in position to engage the projections of said rotary member, a movable member slidably mounted on said shaft and having a device thereon adapted to contact with said dog during the rotation of said disk and withdraw the same from engagement with said projections, means for moving said movable member to disengage said device from said dog, said last mentioned means being controlled by said driving means.

5. A device of the kind described comprising a driving shaft having a gear wheel thereon, a driven shaft, a disk secured to said driven shaft, a rotary member loosely mounted on said driven shaft and having a series of projections thereon, and also having gear teeth thereon cooperating with the gear wheel of said driving shaft, a dog movably mounted on said disk in position to engage said projections on the rotary member, a movable member slidably mounted on said driven shaft and having devices arranged to contact with said dog during rotation of said disk to withdraw the same from engagement with said projections, means tending to hold said movable member in position to cause said devices to engage said dog, means for moving said movable member to disengage said devices from said dog, said last named means comprising a cam-disk secured to said driving shaft, and a lever having one end secured to said movable member and having at the other end a part arranged to engage the cam on said cam disk.

6. A device of the kind described comprising a driving shaft having a gear wheel thereon, a driven shaft, a disk secured to said driven shaft, a rotary member loosely mounted on said driven shaft and having a series of projections thereon, means operated from said driving shaft for continuously rotating said rotary member, a dog movably mounted on said disk in position to engage said projections on the rotary member, a movable member slidably mounted on said driven shaft and having devices arranged to contact with said dog during rotation of said disk to withdraw the same from engagement with said projections, means tending to hold said movable member in position to cause said devices to engage said dog, means for moving said movable member to disengage said devices from said dog, said last named means comprising a cam-disk, operated by said driving shaft, and means operated by said cam-disk for moving said movable member to disengage said devices from said dog.

In testimony whereof I affix my signature.

FRANK M. JOSLIN.